US006837328B2

United States Patent
Neugebauer et al.

(10) Patent No.: US 6,837,328 B2
(45) Date of Patent: Jan. 4, 2005

(54) MOTORCYCLE FRAME AND A METHOD OF MAKING SAME

(75) Inventors: Dietmar Neugebauer, Ilmmuenster (DE); Ralf Moelleken, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 100 days.

(21) Appl. No.: 10/201,297

(22) Filed: Jul. 24, 2002

(65) Prior Publication Data

US 2003/0019678 A1 Jan. 30, 2003

(30) Foreign Application Priority Data

Jul. 24, 2001  (DE) .......................................... 101 35 931

(51) Int. Cl.[7] .............................................. B62K 11/02
(52) U.S. Cl. ........................ 180/225; 180/229; 280/831
(58) Field of Search ............................... 180/219, 225, 180/229, 311; 280/831, 835; 123/41.33; 165/42

(56) References Cited

U.S. PATENT DOCUMENTS

| 1,386,354 A | * | 8/1921 | Owen ........................... 180/225 |
| 3,945,463 A | * | 3/1976 | Okano et al. ............... 184/6.13 |
| 4,678,054 A | * | 7/1987 | Honda et al. ................ 180/225 |
| 4,690,236 A | * | 9/1987 | Shinozaki et al. ........... 180/219 |
| 4,951,774 A |   | 8/1990 | Buell |
| 5,012,883 A | * | 5/1991 | Hiramatsu ................... 180/225 |
| 5,031,580 A |   | 7/1991 | Takagi |
| 5,054,571 A | * | 10/1991 | Takasaka ..................... 180/219 |
| 5,975,230 A | * | 11/1999 | Bourget ....................... 180/225 |
| 6,186,550 B1 |   | 2/2001 | Horii et al. |
| 6,341,792 B1 | * | 1/2002 | Okuma ..................... 280/304.3 |

FOREIGN PATENT DOCUMENTS

| DE | 690 06 769 | 6/1994 |
| JP | 2-204187 | * 8/1990 |

* cited by examiner

*Primary Examiner*—Anne Marie Boehler
(74) *Attorney, Agent, or Firm*—Crowell & Moring LLP

(57) ABSTRACT

The motorcycle frame involves a "bridge frame" in which a motor oil reservoir is incorporated. The bridge frame has two longitudinal tubes arranged at a distance from each other and basically symmetrically to the central longitudinal plane of the motorcycle, the one end of which, respectively, is connected with the steering head bearing tube, and which are connected with each other in the region between the steering head bearing tube and its other end through a front cross tube near the steering head bearing and a rear cross tube. The longitudinal support tubes and the cross tubes form a closed fluid system, which is used as a motor oil reservoir.

42 Claims, 4 Drawing Sheets

MOTORCYCLE FRAME AND A METHOD OF MAKING SAME

BACKGROUND AND SUMMARY OF THE INVENTION

This application claims the priority of German Patent Document DE 101 35 931.4, filed on Jul. 24, 2001, the disclosure of which is expressly incorporated by reference herein.

The present invention relates to a motorcycle frame with two longitudinal support tubes, the one end of which is connected, in any given case, with a steering head bearing tube, whereby at least one frame element forms a motor oil reservoir.

A triangular motorcycle frame is known from DE 690 067 69 T2 with a steering head bearing tube in which the handlebar is pivoted and with which an upper main tube and a lower main tube are connected centrally or in the middle. The upper main tube and the lower main tube are connected with each other by a bridging tube running obliquely downward. Such a motorcycle frame where the frame tubes lie in the central longitudinal plane of the motorcycle is designated as a "central frame." The upper main tube, the lower main tube and the bridging tube form a closed fluid system, which is used as a motor oil reservoir and to which a motor oil inflow and a motor oil outflow are connected.

For motorcycle motors with dry sump lubrication an oil reservoir is needed which is either contained in the frame construction as additional volume, as explained above, or which is formed by a separate oil container. With the high performance data of modern motorcycle motors, a chassis which is as stable as possible and distortion-resistant is required. Central frames are only suited for this conditionally since they have a relatively low torsion stability.

An aspect of the invention is to create a motorcycle frame with integrated motor oil reservoir and an improved stability.

This aspect is accomplished in that the motorcycle frame is a bridge frame, the longitudinal support tubes which are arranged basically symmetrically in relation to a central longitudinal plane of the motorcycle frame, and which are connected with each other in the region between the steering head bearing tube and its other end by a front cross tube near the steering head bearing and by a rear cross tube, whereby the longitudinal support tubes and the cross tubes have a fluid connection with each other and form the motor oil reservoir. Advantageous configurations and refinements of the invention are to be inferred from the preferred embodiments.

A basic principle of certain preferred embodiments of the invention is embodied in the use of a "bridge frame" into which the motor oil reservoir is incorporated. A bridge frame has two longitudinal tubes arranged at a distance from each other and basically symmetrical to the central long plane of the motorcycle, the one end of which is connected with the steering head bearing tube, respectively and which, in the region between the steering head bearing tube and its other end, are connected with each other by a front cross tube near the steering head bearing and a rear cross tube. In accordance with certain preferred embodiments of the invention, the longitudinal support tubes and the cross tubes form a closed fluid system, which is used as a motor oil reservoir.

The bridge frame runs obliquely backward from the steering head bearing tube in the direction of the center of the motorcycle toward the transmission. In the region between the two longitudinal support tubes and the cross tubes, the motor and the radiator of the motorcycle are arranged. With a bridge frame, the motor serves as a "carrying element." Bridge frame constructions are designed such that they have the greatest stability possible and a light weight, whereby the frame cross-sections are large and the wall thicknesses of the frames are small. The closed frame profile of a bridge frame consequently encloses a relatively large hollow volume, which is used as a motor oil reservoir or as an oil tank.

According to a refinement of an embodiment of the invention, a filler neck is provided on one of the two longitudinal support tubes or lateral profiles for oil filling in the region of the steering head bearing. The filler neck is basically arranged vertically and encloses a concave angle with the longitudinal support tube that is shaped obliquely backward. A seal with an oil measuring stick fastened thereupon is arranged on the opening of the filler neck, which is flexible so that it can fit, when inserted, into the filler neck of the allocated longitudinal support tube corresponding to the interior space contour of the motor oil reservoir of the longitudinal support tube. Consequently, filling with oil and checking the oil are possible through a single "opening."

The motor oil reservoir of the bridge frame is attached to the motor oil circulation through a motor oil inflow leading to the motor and a motor oil reflux coming from the motor. The inflow to the motor is arranged on the rear or lower cross tube of the bridge frame. An oil filter or an oil strainer is provided between an inflow connection arranged on the upper cross tube and the motor which filters out residues or impurities from the oil and prevents these from getting into the motor oil circulation. A reflux connection is arranged on the upper cross tube, which enables a return of the motor oil into the two frame profiles or longitudinal support tubes. Owing to the relatively large frame surface in comparison to a central frame, an improved heat removal is guaranteed in addition.

According to a refinement of certain preferred embodiments of the invention, so-called surge protection elements are arranged in the longitudinal support tubes of the bridge frame. The surge protection elements have the function of a stop valve. They are supposed to enable a motor oil flow from the upper or forward cross tube to the lower or rear cross tube and prevent a reversed motor oil flow, for example, with a hard braking of the motorcycle, in order to ensure a dependable provision of the motor by holding back motor oil even with strong vehicular delays.

The surge protection elements are preferably made of plastic and are pressed into the longitudinal support tubes before the individual frame tubes are connected with one another, for example by pressure welding.

The surge protection elements have at all times a frame or mounting element, which has in the undeflected state a certain excess in relation to the internal dimensions of the longitudinal tubes and consequently seals in the pressed-in state. A flap-like element is arranged on the frame or mounting element which functions as a "stop flap" and is swivellable in the direction of the rear cross tube. The flap-like element can, for example, be a "plastic flap" fastened unilaterally on the frame of the surge protection element. Through the surge protection element, a secure oil provision for the motor is therewith guaranteed even with heavy braking, especially with full braking.

According to an embodiment of the invention, heat and contact protection elements are arranged on exteriors of the longitudinal support tubes facing away from one another. These "shields" are provided for shielding the legs of the driver and prevent an excessively heat action upon the driver.

Other objects, advantages and novel features of the present invention will become apparent from the following detailed description of the invention when considered in conjunction with the accompanying drawings.

DETAILED DESCRIPTION OF THE DRAWINGS

Figure 1:
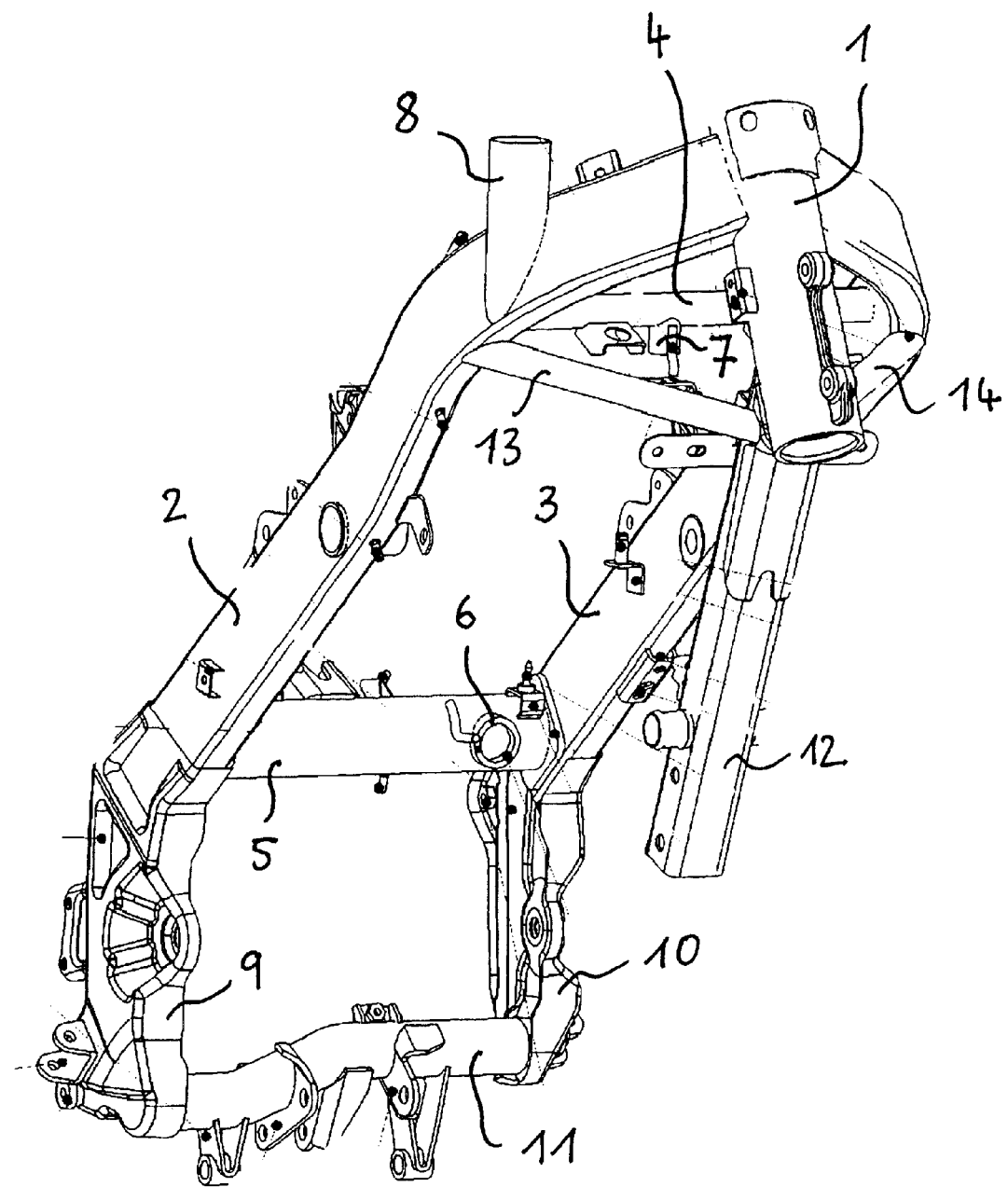
FIG. 1 shows a bridge frame from the right front.

FIG. 1 shows a motorcycle frame, which is designated as a so-called "bridge frame." Two longitudinal support tubes extend obliquely from a steering head bearing tube 1 downward toward the rear basically symmetrical to the central longitudinal plane, namely a right longitudinal support tube 2 and a left longitudinal support tube 3. The two longitudinal support tubes 2 and 3 are connected with each other through a front or upper cross tube 4 in the region of steering head bearing tube 1. In the region of their back ends, the two longitudinal support tubes 2 and 3 are joined with each other through a rear or lower cross tube 5. An inflow connection 6 is provided on the lower cross tube 5 through which motor oil comes out of the bridge frame to the motor (not represented). A filter or a strainer (not represented) is arranged between the inflow connection 6 and the motor oil circulation, keeping impurities from the motor. Furthermore, a reflux connection 7 is provided on the upper cross tube 4 through which the motor oil flows from the motor back into the bridge frame.

The two longitudinal support tubes 2 and 3 as well as the two cross tubes 4 and 5 form a closed motor oil reservoir which is used as an oil tank.

In the area of the steering tube bearing head 1, a filler neck 8 is provided on the right longitudinal support tube 2 through which oil can be poured into the bridge frame. An oil measuring stick, not shown here, can be screwed or inserted into the filler neck 8. The oil measuring stick has preferably a flexible shaft, which can bend in accordance with the interior contour of the longitudinal 2 when inserted into the filler neck 8. It is possible to pour in oil as well as check the oil level through the filler neck 8.

The two longitudinal support tubes 2 and 3 are connected with a lower frame element 9, 10, 11 in the region of the lower cross tube 5, on which the swing arm rear suspension (not represented) is mounted. The lower frame element 9–11 nonetheless does not form a motor oil reservoir. It especially has no fluid connection with the longitudinal support tubes 2 and 3 or cross support tubes 4 and 5.

For the sake of completeness, reference is additionally only made to a central tube 12, which is connected with the lower region of the steering head bearing tube 1 and with longitudinal support tubes 2 and 3 through braces 13, 14.

The central tube 12 and braces 13, 14 are here likewise not a component of the motor oil reservoir. That is, they do not have a fluid connection with the longitudinal support tubes 2, 3 and cross tubes 4, 5.

The motor oil reservoir of the bridge frame formed by longitudinal support tubes 2 and 3 and cross tubes 4 and 5 can become relatively hot during operation owing to the motor oil contained therein. Therefore heat or contact shields 30 be arranged on the exteriors of longitudinal support tubes 2 and 3, in particular through the "right" exterior of the longitudinal support tube 2 represented in the foreground of the image and the, here concealed, left exterior of the longitudinal support tube 3 which shield the legs of the driver from the hot longitudinal support tubes 2, 3. The contact shields serve as heat protection.

Figure 2:
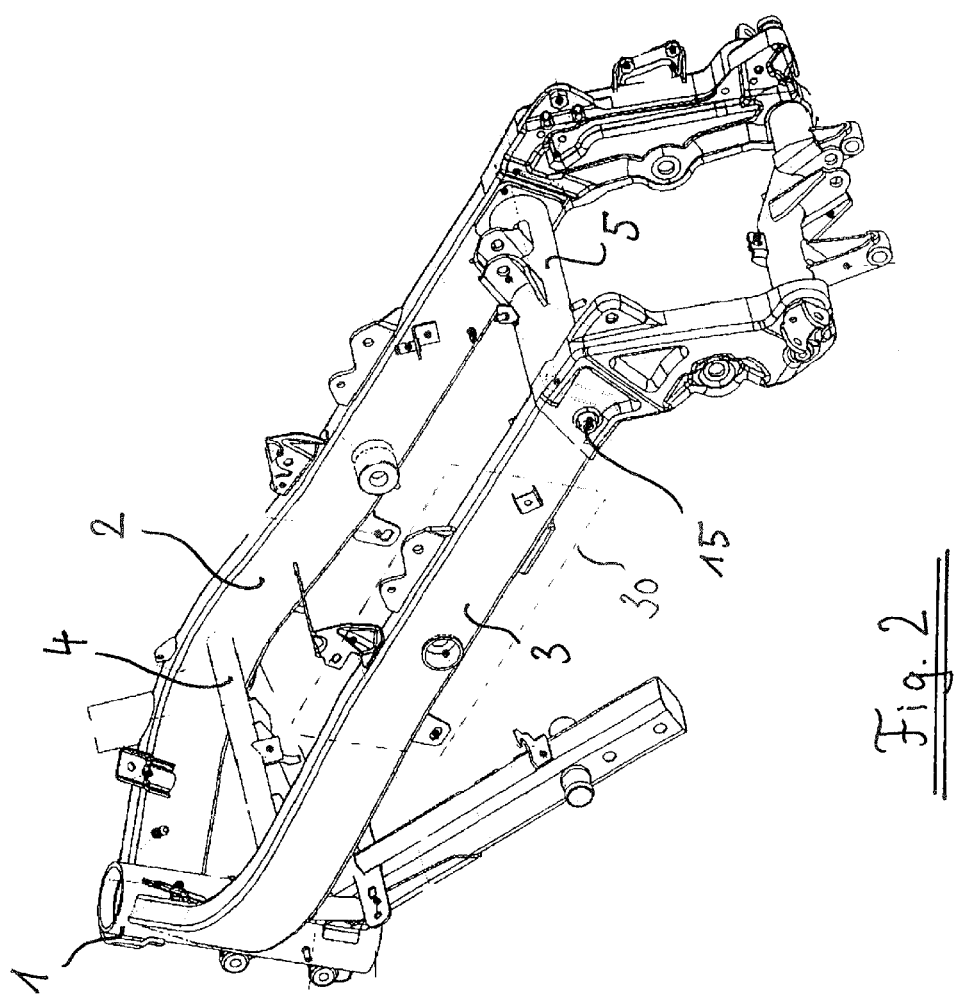
FIG. 2 shows the bridge frame of FIG. 1 from the left rear.

FIG. 2 depicts the bridge frame in FIG. 1 viewed from the rear left. In this view, an oil drain plug 15 can be recognized on the left exterior of longitudinal support tube 3 through which emptying the motor oil contained in longitudinal support tubes 2, 3 and cross tubes 4, 5 is possible during an oil change.

In the interior of longitudinal support tubes 2 and 3, in the region between the upper or front cross tube 4 and the lower or rear cross tube 5, so-called surge protection elements (not represented here) are arranged, which will be explained in even greater detail in connection with FIGS. 3–6. The surge protection elements primarily have the purpose of preventing a "back flow" of motor oil in the longitudinal support tubes 2, 3 in the direction from the lower cross tube 5 to the upper cross tube 4 and enabling a flow of oil in the longitudinal support tubes 2, 3 in the direction from the upper cross tube 4 to the lower cross tube 5.

Especially with hard braking, there is the danger of the motor oil flowing forward or upward as a consequence of forces of inertia in the longitudinal support tubes 2, 3 and of the supply of the motor with motor oil being interrupted for a short time, which can lead to motor damage. Such an interruption of oil provision can be prevented reliably by the surge protection elements. They function namely as "stop valves" which are open in the direction toward the motor and closed in the reversed direction.

FIGS. 3–6 show the constructive structure of the surge protection elements.

Figure 4:
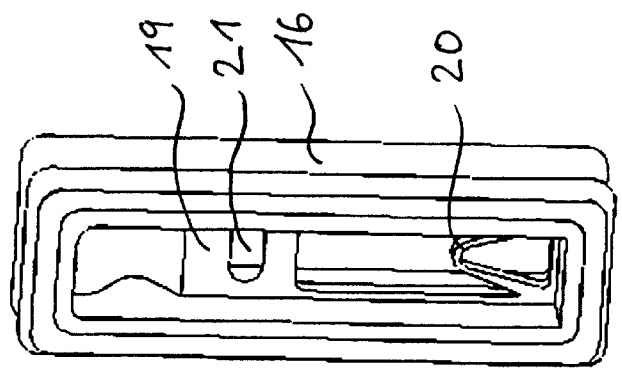
FIG. 4 shows a frame of a surge protection element in perspective representation.
Figure 3:
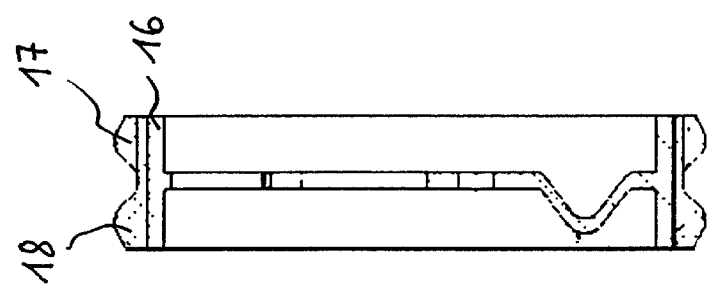
FIG. 3 shows a cross section of a surge protection element.

As is apparent from FIGS. 3 and 4, a surge protection element comprises a frame element 16, on the outer circumference of which elastic circular sealing lips 17, 18 are arranged. The sealing lips 17, 18 have in their undeflected state, represented here, a certain excess in relation to the internal dimensions of the longitudinal support tubes 2, 3. Before the bridge frame is welded together, the surge protection elements are pressed into the longitudinal support tubes 2, 3, whereby the sealing lips 17, 18 are deflected and assure a sealing in relation to the internal contour of longitudinal support tubes 2, 3. The frame element 16 can, for example, be a plastic injection molded composite part.

Figure 6:
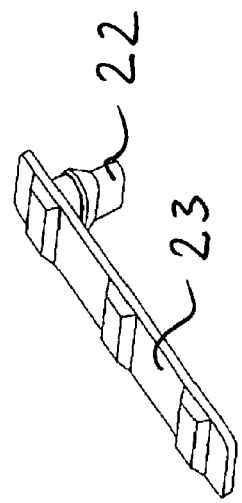
FIG. 6 shows the flap element of FIG. 5 in perspective representation.
Figure 5:
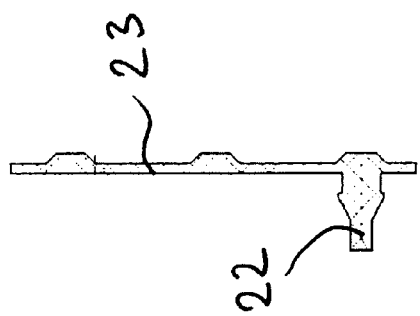
FIG. 5 shows a flap element of a surge protection element in side view.

In the frame interior of the frame element 16, mounting and bracing elements 19, 20 are arranged. In the region of the mounting element 19, a recess 21 is provided into which an "fastening knob" 22 (FIGS. 5, 6) of an elastic flap-like element 23 is inserted. In the assembled state, the flap-like element 23 represented in FIGS. 5, 6 is thus inserted into frame 16 of the surge protection element. Owing to its bending elasticity, the flap-like element 23 functions as a stop valve.

The surge protection element is pressed into the bridge frame such that the flap-like elements 23 of the surge protection elements can "swing" in relation to fastening knob 22 in the direction toward the lower cross tube 5. This makes a motor oil flow toward the motor possible, that is toward cross tube 5. In contrast, with an "inclination for back flow," the flap-like element 23 lies on the mounting or bracing elements 19, 20 of frame 16 and consequently prevents a back-flow of motor oil in the longitudinal support tubes 2, 3 toward the upper cross tube 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motorcycle frame, comprising two longitudinal support tubes, a first end of which is connected, respectively, with a steering head bearing tube, whereby at least one frame element forms a motor oil reservoir, wherein the motorcycle frame is a bridge frame, the longitudinal support tubes of the bridge frame being arranged basically symmetrically in relation to a central longitudinal plane of the motorcycle frame, and said longitudinal support tubes are connected with each other in a region between the steering head bearing tube and a second end by a front cross tube near a steering head bearing and by a rear cross tube, whereby the longitudinal support tubes and the cross tubes have a fluid connection with each other and form the motor oil reservoir, and wherein, in the longitudinal support tubes, a surge protection element, respectively, is arranged, which permit an oil flow from the front cross tube to the rear cross tube and which are closed during an oil flow in an opposite direction from the rear cross tube to the front cross tube.

2. Motorcycle frame according to claim 1, wherein the surge protection elements are made of plastic.

3. Motorcycle frame according to claim 1, wherein the surge protection elements are pressed into the respective longitudinal support tubes.

4. Motorcycle frame according to claim 2, wherein the surge protection elements are pressed into the respective longitudinal support tubes.

5. Motorcycle frame according to claim 1, wherein the surge protection elements are formed by a frame element and a flap element arranged on the frame element, whereby the flap element functions as a stop valve and can be swivelled in a direction toward the rear cross tube.

6. Motorcycle frame according to claim 2, wherein the surge protection elements are formed by a frame element and a flap element arranged on the frame element, whereby the flap element functions as a stop valve and can be swivelled in a direction toward the rear cross tube.

7. Motorcycle frame according to claim 3, wherein the surge protection elements are formed by a frame element and a flap element arranged on the frame element, whereby the flap element functions as a stop valve and can be swivelled in a direction toward the rear cross tube.

8. Motorcycle frame according to claim 5, wherein the flap element is an elastic plastic flap which is fastened with one end on the frame element.

9. Motorcycle frame according to claim 1, wherein the frame element has elastic sealing lips on an outer periphery which, in a pressed-in state, adapt to an interior contour of the longitudinal support tubes.

10. Motorcycle frame according to claim 2, wherein the frame element has elastic sealing lips on an outer periphery which, in a pressed-in state, adapt to an interior contour of the longitudinal support tubes.

11. Motorcycle frame according to claim 3, wherein the frame element has elastic sealing lips on an outer periphery which, in a pressed-in state, adapt to an interior contour of the longitudinal support tubes.

12. Motorcycle frame according to claim 5, wherein the frame element has elastic sealing lips on an outer periphery which, in a pressed-in state, adapt to an interior contour of the longitudinal support tubes.

13. Motorcycle frame according to claim 8, wherein the frame element has elastic sealing lips on an outer periphery which, in a pressed-in state, adapt to an interior contour of the longitudinal support tubes.

14. Motorcycle frame according to claim 2, wherein heat and contact protection elements for preventing a driver's legs from coming into contact with the longitudinal support tubes are arranged on exterior sides of the longitudinal support tubes facing away from each other.

15. Motorcycle frame according to claim 2, wherein heat and contact protection elements for preventing a driver's legs from coming into contact with the longitudinal support tubes are arranged on exterior sides of the longitudinal support tubes facing away from each other.

16. Motorcycle frame according to claim 3, wherein heat and contact protection elements for preventing a driver's legs from coming into contact with the longitudinal support tubes are arranged on exterior sides of the longitudinal support tubes facing away from each other.

17. Motorcycle frame according to claim 5, wherein heat and contact protection elements for preventing a driver's legs from coming into contact with the longitudinal support tubes are arranged on exterior sides of the longitudinal support tubes facing away from each other.

18. Motorcycle frame according to claim 8, wherein heat and contact protection elements for preventing a driver's legs from coming into contact with the longitudinal support tubes are arranged on exterior sides of the longitudinal support tubes facing away from each other.

19. Motorcycle frame according to claim 1, wherein heat and contact protection elements for preventing a driver's legs from coming into contact with the longitudinal support tubes are arranged on exterior sides of the longitudinal support tubes facing away from each other.

20. Motorcycle frame according to claim 2, wherein, on the rear cross tube, an oil outlet connection is provided for supplying a motor with motor oil from the bridge frame.

21. Motorcycle frame according to claim 3, wherein, on the rear cross tube, an oil outlet connection is provided for supplying a motor with motor oil from the bridge frame.

22. Motorcycle frame according to claim 5, wherein, on the rear cross tube, an oil outlet connection is provided for supplying a motor with motor oil from the bridge frame.

23. Motorcycle frame according to claim 8, wherein, on the rear cross tube, an oil outlet connection is provided for supplying a motor with motor oil from the bridge frame.

24. Motorcycle frame according to claim 1, wherein, on the rear cross tube, an oil outlet connection is provided for supplying a motor with motor oil from the bridge frame.

25. Motorcycle frame according to claim 20, wherein the oil outlet connection is connected with an oil intake connection through an oil filter or an oil strainer.

26. Motorcycle frame according to claim 21, wherein the oil outlet connection is connected with an oil intake connection through an oil filter or an oil strainer.

27. Motorcycle frame according to claim 1, wherein, on the front cross tube, an oil reflux connection is provided for a reflux of motor oil from a motor into the bridge frame.

28. Motorcycle frame according to claim 2, wherein, on the front cross tube, an oil reflux connection is provided for a reflux of motor oil from a motor into the bridge frame.

29. Motorcycle frame according to claim 3, wherein, on the front cross tube, an oil reflux connection is provided for a reflux of motor oil from a motor into the bridge frame.

30. Motorcycle frame according to claim 5, wherein, on the front cross tube, an oil reflux connection is provided for a reflux of motor oil from a motor into the bridge frame.

31. Motorcycle frame according to claim 8, wherein, on the front cross tube, an oil reflux connection is provided for a reflux of motor oil from a motor into the bridge frame.

32. Motorcycle frame according to claim 1, wherein an oil filler neck is provided on one of the longitudinal support tubes in a region between the steering head bearing tube and the front cross tube.

33. Motorcycle frame according to claim 2, wherein an oil filler neck is provided on one of the longitudinal support tubes in a region between the steering head bearing tube and the front cross tube.

34. Motorcycle frame according to claim 3, wherein an oil filler neck is provided on one of the longitudinal support tubes in a region between the steering head bearing tube and the front cross tube.

35. Motorcycle frame according to claim 5, wherein an oil filler neck is provided on one of the longitudinal support tubes in a region between the steering head bearing tube and the front cross tube.

36. Motorcycle frame according to claim 8, wherein an oil filler neck is provided on one of the longitudinal support tubes in a region between the steering head bearing tube and the front cross tube.

37. Motorcycle frame according to claim 1, wherein an oil drainage opening is provided on an exterior side of one of the longitudinal support tubes in a region of the rear cross tube.

38. Motorcycle frame according to claim 2, wherein an oil drainage opening is provided on an exterior side of one of the longitudinal support tubes in a region of the rear cross tube.

39. Motorcycle frame according to claim 3, wherein an oil drainage opening is provided on an exterior side of one of the longitudinal support tubes in a region of the rear cross tube.

40. Motorcycle frame according to claim 5, wherein an oil drainage opening is provided on an exterior side of one of the longitudinal support tubes in a region of the rear cross tube.

41. A motor oil reservoir for a motorcycle, comprising:

a first longitudinal support tube, a second longitudinal support tube, each of said support tubes connecting at a first end with a steering head bearing tube, said support tubes being arranged basically symmetrically in relation to a central longitudinal plane of the motorcycle and forming a bridge frame, a front cross tube connecting said support tubes near a steering head bearing in a region between the steering head bearing tube and a second end of the support tubes, and a rear cross tube connecting said support tubes, wherein the support tubes and the cross tubes are in fluid communication with each other, and wherein, in each of the longitudinal support tubes, a surge protection element is arranged which permits an oil flow from the front cross tube to the rear cross tube and wherein each surge protection element is closed during an oil flow in an opposite direction from the rear cross tube to the front cross tube.

42. A method of making a motorcycle frame, comprising:

providing two longitudinal support tubes, connecting a first end of each of said support tubes with a steering head bearing tube, arranging the support tubes approximately symmetrically in relation to a central longitudinal plane of the motorcycle frame to thereby form a bridge frame, and connecting the support tubes with each other in a region between the steering head bearing tube and a second end of the support tubes by a front cross tube near a steering head bearing and by a rear cross tube, wherein the support tubes and the cross tubes have a fluid connection with each other and form a motor oil reservoir, and wherein, in each of the longitudinal support tubes, a surge protection element is arranged which permits an oil flow from the front cross tube to the rear cross tube and wherein each surge protection element is closed during an oil flow in an opposite direction from the rear cross tube to the front cross tube.

* * * * *